United States Patent [19]

Poncha

[11] 4,022,868
[45] May 10, 1977

[54] TRONA CALCINATION
[75] Inventor: Rustom P. Poncha, Syracuse, N.Y.
[73] Assignee: Allied Chemical Corporation, Morris Township, N.J.
[22] Filed: June 17, 1975
[21] Appl. No.: 587,576
[52] U.S. Cl. .............................. 423/184; 23/302 T; 423/206 T; 423/421
[51] Int. Cl.² .......................................... C01D 7/00
[58] Field of Search ............... 423/206 T, 179, 421, 423/184; 23/302 T

[56] References Cited
UNITED STATES PATENTS

| 3,689,218 | 9/1972 | Hodges | 423/636 |
|---|---|---|---|
| 3,838,189 | 9/1974 | Sopchak et al. | 423/206 T |
| 3,870,780 | 3/1975 | Guptill | 423/206 T |

Primary Examiner—O. R. Vertiz
Assistant Examiner—Wayne A. Langel
Attorney, Agent, or Firm—Gerhard H. Fuchs; Gerard P. Rooney

[57] ABSTRACT

In the process of making sodium carbonate from trona involving the steps of crushing the trona, calcining the crushed trona, dissolving the calcined trona to obtain a solution comprising sodium carbonate and insoluble impurities contaminated by soluble silicates and soluble carbonaceous matter, contamination of the sodium carbonate solution with soluble carbonaceous matter is reduced by the improvement which comprises calcining the crushed trona at temperature of 300° C. to 600° C. in the presence of magnesium oxide. When the trona is calcined in the presence of magnesium oxide at temperature of 350° to 600° C., then the sodium carbonate solution is low in both soluble carbonaceous matter as well as insoluble silicates.

7 Claims, No Drawings

TRONA CALCINATION

BACKGROUND OF THE INVENTION

Naturally occurring trona, such as found in subterranean deposits in Sweetwater and adjacent counties in Wyoming, consists mainly of sodium sesquicarbonate ($Na_2CO_3 \cdot NaHCO_3 \cdot 2H_2O$) containing about 3 to 15% or, more generally, 5 to 10% by weight of insoluble impurities, mainly shale. Since the trona is usually found near the oil shale formations of the upper Colorado River basin, it is further contaminated by carbonaceous matter, usually in amount in the order of about 0.1 to 0.5% by weight, expressed as elemental carbon.

In the production of sodium carbonate from natural trona, it is usual procedure to calcine the trona at elevated temperature, in the order of 200° to 600° C., to obtain crude sodium carbonate:

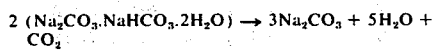

$$2\ (Na_2CO_3 \cdot NaHCO_3 \cdot 2H_2O) \rightarrow 3Na_2CO_3 + 5H_2O + CO_2$$

Calcination of the trona effects moisture removal, reduction or elimination of carbonaceous matter as well as transformation of the sodium sesquicarbonate into sodium carbonate. In general, elimination of organic matter is favorably influenced by increase in calcination temperature. However, calcination at elevated temperature also causes sodium carbonate to react with silica contained in the trona to form soluble silicates. The quantity of soluble silicates so formed increases materially with increase in calcination temperature.

Both, soluble carbonaceous matter as well as soluble silicates are major impurities in solutions obtained by dissolving calcined trona and, unless steps are taken to reduce contamination of sodium carbonate process liquors with soluble silicates and carbonaceous matter, these contaminants may become significant impurities in the soda ash prepared from such liquors. Carbonaceous matter, if not removed from the sodium carbonate process liquors, not only contaminates the soda ash product, but such carbonaceous matter also includes crystal habit modifiers which adversely modify the crystal structure of the sodium carbonate monohydrate produced by crystallization from the sodium carbonate process liquors, and further causes troublesome foaming of such liquors.

Two methods are commonly employed for eliminating undesirable carbonaceous matter in the trona soda ash process. The first method involves treatment of the trona process liquor with activated carbon. The major drawback of this approach is that not all of the critical organic crystal habit modifiers are readily absorbed and tend to remain in solution, causing less than ideal crystals to form. Furthermore, treatment of process liquors with activated carbon involves considerable expense and poses disposal problems for the spent carbon. The second method involves burning off the carbonaceous matter by conducting calcination at very high temperatures in excess of about 350° C. This method is quite effective, but unfortunately causes increase in formation of soluble silicates.

SUMMARY OF THE INVENTION

The present invention concerns an improvement in the process for making sodium carbonate from trona wherein contamination of sodium carbonate process liquors with soluble carbonaceous matter is reduced, which involves calcining the crushed trona at elevated temperature in the presence of magnesium oxide.

I have now discovered that in the process of making sodium carbonate from trona involving the steps of crushing the trona, calcining the crushed trona, dissolving the calcined tona to obtain a solution comprising sodium carbonate and insoluble impurities contaminated by soluble silicate and soluble carbonaceous matter, contamination of the sodium carbonate solution with soluble carbonaceous matter is reduced by the improvement which comprises calcining the crushed trona at temperature of 300° to 600° C. in the presence of magnesium oxide. Contamination of the sodium carbonate solution with both, soluble carbonaceous matter as well as with soluble silicates is reduced by calcining the crushed trona at temperature of 350° to 600° C. in the presence of magnesium oxide.

It should be appreciated that reduction of soluble silicates and soluble carbonaceous matter, for purposes of the present invention, is relative to levels of soluble silicates and soluble carbonaceous matter obtained when calcination of the trona is conducted in the absence of added magnesium oxide.

Calcination in the presence of magnesium oxide in accordance with my invention may be conducted in conjunction with the usual calcination step wherein the sodium sesquicarbonate component of the trona is transformed into sodium carbonate, or, if desired, it may be carried out as a separate additional step following the usual calcination procedure.

DETAILED DESCRIPTION OF THE INVENTION AND OF THE PREFERRED EMBODIMENTS

Prior to calcination in the presence of magnesium oxide in accordance with the present invention, the trona is first crushed to particle size predominately passing through ½ in. mesh screen, preferably 3 mesh screen (Tyler). If trona of substantially larger particle size is used, then the full benefits of the improvement of the present invention may not be obtained.

The magnesium oxide may be added to the trona before or during calcination, preferably in finely divided form, say of particle size substantially passing through 20 mesh screen (Tyler), preferably, passing through 50 mesh screen (Tyler), more preferably passing through 150 mesh screen (Tyler). The magnesium oxide employed in amount of from about 0.5 to about 5% by weight, based on the weight of the trona feed, preferably about 1 to about 3% by weight or, more preferably yet about 1.5 to about 2.5% by weight, based on the trona feed. If the magnesium oxide is employed in amount of less than about 0.5% by weight, then reduction of soluble carbonaceous matter may not be sufficiently significant from a practical point of view. Use of the magnesium oxide in excess of about 5% by weight results no particular additional benefits and would be wasteful. There are no requirements that the magnesium oxide be of any particular grade or purity; reagent grades and crude technical grades, and any intermediate grades are all suitable.

Calcination of the trona is ordinarily conducted in direct fired rotary furnaces, or in indirectly heated rotary furnaces, and both types of furnaces are eminently suitable for practice of the method of the present invention. However, any type of furnace capable of effecting heating the trona and the magnesium oxide together to temperatures in the range below described is suitable for the practice of the present invention. Ordinarily, the magnesium oxide and the trona are fed together to the furnace and are passed through the furnace in the usual manner. However, magnesium oxide need not be added initially to the trona as it is being fed to the furnace, but it may be added at a later time or at a point downstream in the furnace, so that the magnesium oxide comes into contact with the already calcined trona, which now comprises sodium carbonate together with insolubles and impurities. Trona and magnesium oxide are intimately mixed, either before or during calcination.

Calcination of the trona in the presence of magnesium oxide in accordance with the method of the present invention may be carried out at temperatures between about 300° and 600° C., preferably at temperatures between 350° and 500° C., more preferably yet at temperatures between about 350° and 400° C.

Calcination in the presence of magnesium oxide in accordance with my invention is carried out for time sufficient to achieve reduction of soluble carbonaceous matter and, optionally, reduction of soluble silicates. Calcination times of 20 to 60 minutes are ordinarily sufficient to achieve these objectives. Indeed, time required for calcination of the trona to transform it into sodium carbonate is ordinarily sufficient to achieve the desired result of the method of my invention.

Following calcination in the presence of magnesium oxide in accordance with the method of the present invention, the trona is dissolved in an aqueous medium, usually an aqueous sodium carbonate solution from previous operation, in usual manner to obtain a substantially saturated solution of sodium carbonate having reduced contamination with soluble carbonaceous matter and, if calcination was conducted above about 350° C., reduced contamination with soluble silicates as well.

ml. portion of the solution was withdrawn and filtered through a Whatman No. 42 filter into 50 ml of water.

Soluble silicate was determined photometrically. For high silicate levels (5000 ppm $SiO_2$, basis $Na_2CO_3$ or above) the sample was acidified to pH 1.4 and ammonium molybdate was added to form the yellow complex. The absorbance was measured at 410 millimicrons. For lower silicate levels the yellow complex was reduced with 1-amino-2-naphthol-4-sulfonic acid to molybdenum blue and the measurement was made at 660 millimicrons. The silicate concentrations were read off appropriate standard curves.

Soluble carbonaceous matter was determined as carbon by oxidizing it to carbon dioxide. Carbonate (inorganic carbon) was first removed by acidification and boiling. The carbonaceous matter (organic carbon) was then oxidized to carbon dioxide using silver catalyzed potassium persulfate in sulfuric acid, and the evolved $CO_2$ was absorbed in standardized potassium hydroxide solution to form potassium carbonate. The carbonate ion was precipitated as barium carbonate by addition of barium chloride, and the unreacted potassium hydroxide was titrated with hydrochloric acid to the phenol-phthalein endpoint. From the amount of potassium hydroxide consumed by the evolved carbon dioxide the amount of organic carbon in the same was calculated.

EXAMPLES I TO XII

COMPARATIVE EXPERIMENTS 1 to 6

Intimate mixtures of 196 parts trona and 4 parts magnesium oxide were prepared and calcined as described above at temperatures indicated in the Table below. Blank tests (Comparative Experiments) employing trona only without magnesium oxide addition were run concurrently. Results are summarized in Table I below:

TABLE I

| Temp. °C | $SiO_2$, ppm (basis $Na_2CO_3$) | | Carbon, ppm (basis $Na_2CO_3$) | |
|---|---|---|---|---|
| | Trona + Magnesium Oxide | Trona Only | Trona + Magnesium Oxide | Trona Only |
| 200 | 147 | 137 | 133 | 125 |
| 300 | 168 | 152 | 615 | 680 |
| 350 | 171 | 206 | 321 | 595 |
| 400 | 260 | 335 | < 5 | 73 |
| 500 | 226 | 630 | < 5 | < 5 |
| 600 | 934 | 2818 | < 5 | < 5 |

The Examples set forth below illustrate preferred practice of the present invention and set forth the best mode presently contemplated for its practice.

The following general procedures were employed in the Examples and Comparative Tests shown below.

Crude trona was ground to particle size substantially passing through 3 mesh screen (Tyler), the ground trona was intimately mixed with finely divided magnesium oxide (passing through 50 mesh screen (Tyler) in the proportions indicated, and the mix was calcined at the indicated temperature for 45 minutes in a stainless steel tray in a muffle furnace.

Following calcination, the calcined mixture was dissolved in deionized water contained in a stainless steel beaker immersed in an oil bath maintained at 90° C. with thermostatic control. The beaker was equipped with stirrer and cover. When the temperature of the water reached 75° C., the calcined mixture was added in amount calculated to give 28% $Na_2CO_3$ solution. The temperature of the water reached 90° C. because of the exothermic hydration reaction. After 30 minutes, a 50

The data in Table I illustrate the surprising effect of magnesium oxide in reducing content of soluble carbonaceous matter in trona calcined at temperatures of about 300° to 400° C., and of reducing content of soluble silicates in trona calcined at temperatures above about 350° C.

I have further found that the effectiveness of magnesium oxide for reducing soluble carbonaceous matter in accordance with my invention can be further enhanced by subjecting the magnesium oxide, prior to adding it to the trona, to temperatures in excess of about 300° C., for at least about 30 minutes, preferably at least about 60 minutes, to activate it. The enhanced effectiveness of activated magnesium oxide is illustrated in the examples below.

EXAMPLES XIII TO XVI

Magnesium oxide (B&A Reagent Grade, Code 1917) was activated by heating it to 350° C. for 45 minutes.

Following the procedure of Examples I to XII, two 198 part by weight portions of the trona were each mixed with 2 parts by weight of magnesium oxide, one portion with unactivated magnesium oxide, and the other portion with magnesium oxide which had been activated as described above. Both mixtures were then calcined at 350° C.

Trona was reduced to particle size substantially passing through 3 mesh (Tyler), and was then calcined without any additive for 45 minutes at 350° C.

Following the procedure of Examples I to XII, two 198 part by weight portions of the trona calcined at 350° C. as described above were each mixed with 2 parts by weight of magnesium oxide, one portion with unactivated magnesium oxide, the other portion with magnesium oxide which had been activated as described above. Both mixtures were calcined at 350° C. Results are summarized in Table II below.

TABLE II

|  | C(ppm) | SiO$_2$(ppm) |
|---|---|---|
|  | (basis Na$_2$CO$_3$) | |
| Calcined trona + MgO (activated) | 399 | 167 |
| Calcined trona + MgO (unactivated) | 620 | 152 |
| Trona + MgO (activated) | 365 | 121 |
| Trona + MgO (unactivated) | 332 | 215 |
| Trona, without additive | 615 | 155 |

Calcination of trona in the presence of magnesium oxide has the further beneficial result that trona so calcined, upon dissolution yields a solution comprising sodium carbonate and insoluble impurities having improved settling and filtration characteristics.

When in the above Examples magnesium oxide is used at other proportions within the purview of the present invention, similar results are obtained, that is to say, calcined trona is obtained which upon dissolution yields sodium carbonate solutions having desirably low contamination with soluble silicates and soluble carbonaceous matter.

Since various changes may be made in carrying out the process of my invention without departing from its scope and essential characteristics, all matter contained in the above description shall be interpreted as illustrative only and not in a limiting sense.

I claim:
1. In the process of making sodium carbonate from trona involving the steps of crushing the trona, calcining the crushed trona, dissolving the calcined trona to obtain a solution comprising sodium carbonate and insoluble impurities, contaminated by soluble silicates, contamination of the sodium carbonate solution with soluble silicates and soluble carbonaceous matter is reduced by the improvement which comprises calcining the crushed trona at temperature of 300° C. to 600° C. in the presence as additive of magnesium oxide in amount of from about 0.5 to about 5 percent by weight, based on the weight of the trona.

2. The improvement of claim 1 wherein the magnesium oxide, prior to adding it to the trona, is activated by heating it to temperature in excess of about 300° C.

3. The improvement of claim 2 wherein the trona, prior to calcination, is reduced to particle size predominantly passing through 3 mesh screen (Tyler), and wherein the magnesium oxide is of particle size substantially passing through 20 mesh screen (Tyler).

4. The improvement of claim 2 wherein the magnesium oxide is added in amount of from about 1 to about 3 parts by weight per 100 parts of trona.

5. The improvement of claim 1 wherein the trona, prior to calcination, is reduced to particle size predominantly passing through 3 mesh screen (Tyler), and wherein the magnesium oxide is of particle size substantially passing through 20 mesh screen (Tyler).

6. The improvement of claim 5 wherein the magnesium oxide is added in amount of from about 1 to about 3 parts by weight per 100 parts of trona.

7. The improvement of claim 1 wherein the magnesium oxide is added in amount of from about 1 to about 3 parts by weight per 100 parts of trona.

* * * * *